No. 642,938. Patented Feb. 6, 1900.
A. W. WARNOCK.
TIRE FASTENER.
(Application filed July 3, 1899.)
(No Model.)
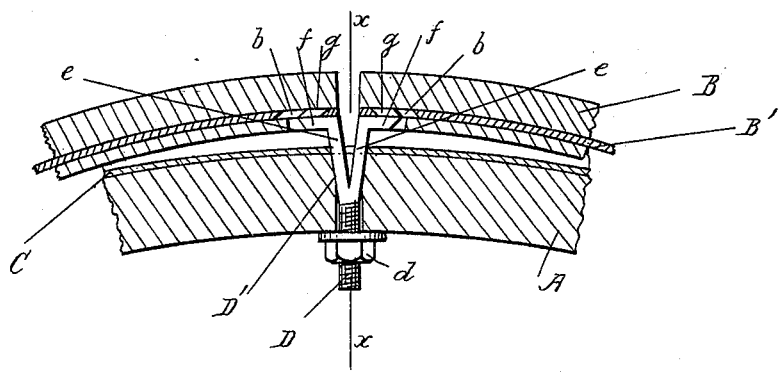
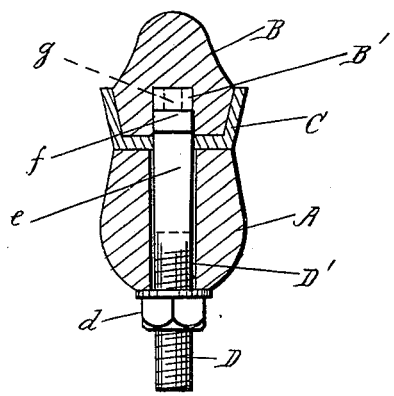
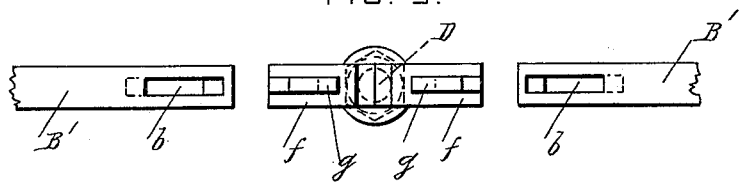
WITNESSES
INVENTOR
Amos W. Warnock
by Herbert W. T. Jenner.
Attorney

UNITED STATES PATENT OFFICE.

AMOS WILLIAM WARNOCK, OF BOSTON, MASSACHUSETTS, ASSIGNOR OF ONE-HALF TO FREDERICK K. DAGGETT, OF MALDEN, MASSACHUSETTS.

TIRE-FASTENER.

SPECIFICATION forming part of Letters Patent No. 642,938, dated February 6, 1900.

Application filed July 3, 1899. Serial No. 722,747. (No model.)

*To all whom it may concern:*

Be it known that I, AMOS WILLIAM WARNOCK, a citizen of the United States, residing at Boston, in the county of Suffolk and State of Massachusetts, have invented certain new and useful Improvements in Tire-Fasteners; and I do hereby declare the following to be a full, clear, and exact description of the invention, such as will enable others skilled in the art to which it appertains to make and use the same.

This invention relates to means for fastening the tires on the wheels of vehicles; and it consists in the novel construction and combination of the parts hereinafter fully described and claimed.

In the drawings, Figure 1 is a longitudinal section of a portion of a vehicle-wheel, showing the fastening device. Fig. 2 is a cross-section taken on the line $x\ x$ in Fig. 1. Fig. 3 is a plan view of the fastening device, showing the end portions of the tire detached.

A is a portion of the felly of a wheel of any approved construction.

B is the tire, which is provided with sockets $b$ at its adjacent ends. In the example shown the tire B is formed of india-rubber, and the sockets $b$ are holes in the adjacent end portions of a metallic band B', which forms the core of the tire; but the band B' may be a metallic tire, or the portions of the band with the sockets may be connected to any approved tire in any approved manner.

C is a flanged rim which encircles the felly and forms a seat for the india-rubber tire.

D is a fastening-bolt which is slidable in a socket or hole D', formed radially through the rim and felly, and $d$ is a nut on the inside of the felly for operating the bolt D. The bolt D is provided with diverging spring-arms $e$, which engage with the socket or hole in the rim and felly and which are drawn toward each other when the bolt is moved toward the hub by means of its nut. The arms are arranged opposite each other in the same plane, so that there is no twisting strain on the bolt. The free ends of the arms $e$ are provided with shoulders $f$ and hooks $g$, so that the hooks $g$ are always supported substantially parallel with the felly in the circular plane of the band B'. The shoulders or flanges $f$ project circumferentially in opposite directions from the tops of the spring-arms $e$. The hooks $g$ are of less width than the shoulders, and they engage with the sockets $b$. The end portions of the band are connected to the hooks before the bolt is drawn toward the hub. The ends of the tire are readily attached to and detached from the free ends of the spring-arms when the parts are in the positions shown in Fig. 1. When the bolt is drawn toward the hub, the end portions of the tire are drawn against the rim of the felly by the hooks, and the ends of the tire are also drawn toward each other, so as to make a neat joint.

What I claim is—

1. The combination, with a wheel-felly provided with a socket, of a slidable tire-fastening bolt provided with diverging spring-arms engaging with the said socket and having circumferentially-projecting flanges or shoulders and hooks at their free ends, and a tire having its end portions detachably connected to the said hooks, substantially as set forth.

2. The combination, with a wheel-felly provided with a socket, of a tire-fastening bolt provided with diverging arms slidable in the said socket, said arms being provided at their free ends with shoulders and hooks of less width than the shoulders, and a tire provided with sockets at its end portions which rest on the said shoulders and engage with the said hooks, substantially as set forth.

In testimony whereof I affix my signature in presence of two witnesses.

AMOS WILLIAM WARNOCK.

Witnesses:
FRED E. SANDS,
S. E. WILBUR.